(12) United States Patent
Nishikawa et al.

(10) Patent No.: US 10,200,483 B2
(45) Date of Patent: Feb. 5, 2019

(54) ORGANIZING LOCATION-BASED SOCIAL NETWORK COMMUNITIES

(71) Applicant: INTERNATIONAL BUSINESS MACHINES CORPORATION, Armonk, NY (US)

(72) Inventors: Hirofumi Nishikawa, Tokyo (JP); Tomohiro Shioya, Tokyo (JP); Kei Sugano, Tokyo (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/010,315

(22) Filed: Jan. 29, 2016

(65) Prior Publication Data
US 2017/0223118 A1    Aug. 3, 2017

(51) Int. Cl.
*H04L 29/08* (2006.01)
*H04L 12/58* (2006.01)
(Continued)

(52) U.S. Cl.
CPC .............. *H04L 67/18* (2013.01); *H04L 51/20* (2013.01); *H04L 51/32* (2013.01);
(Continued)

(58) Field of Classification Search
CPC ...... H04L 67/18; H04L 67/1044; H04L 51/32
See application file for complete search history.

(56) References Cited

U.S. PATENT DOCUMENTS 8,219,498 B2   7/2012  Banerjee et al.
9,251,536 B2*  2/2016  Caralis .............. G06Q 30/0631
(Continued)

FOREIGN PATENT DOCUMENTS

| JP | 2013225338 A | 10/2013 |
| JP | 2013540393 A | 10/2013 |
| JP | 2014207012 A | 10/2014 |

OTHER PUBLICATIONS

Anonymous, "Proximity Based Method for Automatically Joining Social Networking Groups Defined by Zone," An IP.com Prior Art Database Technical Disclosure, Oct. 29, 2012, p. 1-2, IP.com No. 000223045.
(Continued)

*Primary Examiner* — Jerry B Dennison
(74) *Attorney, Agent, or Firm* — Robert C. Bunker (57) ABSTRACT

According to one exemplary embodiment, a method for creating a social network service (SNS) community is provided. The method may include receiving a message from a user associated with an SNS. The method may also include determining a location of the received message based on a time and a position associated with the received message. The method may then include identifying at least one device from within a plurality of registered devices having the same location. The method may further include determining at least one device user based on the identified at least one device. The method may also include creating an SNS community based on the user and the determined at least one device user. The method may then include distributing messages between the user and the determined at least one device user.

12 Claims, 5 Drawing Sheets

(51) Int. Cl.
    *H04W 4/02*    (2018.01)
    *H04W 4/21*    (2018.01)
(52) U.S. Cl.
    CPC ......... *H04L 67/1044* (2013.01); *H04W 4/023* (2013.01); *H04W 4/21* (2018.02)

(56) References Cited

U.S. PATENT DOCUMENTS

| | | | |
|---|---|---|---|
| 9,439,033 B2 * | 9/2016 | Hartzell | H04W 4/21 |
| 2011/0238755 A1 | 9/2011 | Khan et al. | |
| 2012/0079022 A1 | 3/2012 | Kim et al. | |
| 2014/0250174 A1 * | 9/2014 | Zamer | H04W 4/029 |
| | | | 709/204 |
| 2015/0127728 A1 | 5/2015 | Marti et al. | |
| 2015/0264130 A1 | 9/2015 | Pappula | |
| 2016/0358214 A1 * | 12/2016 | Shalunov | G06Q 30/0241 |
| 2017/0223118 A1 * | 8/2017 | Nishikawa | H04L 67/18 |
| 2017/0308608 A1 * | 10/2017 | Freeman | H04W 4/21 |
| 2017/0308812 A1 * | 10/2017 | Kaisser | H04W 4/21 |

OTHER PUBLICATIONS

Lübke et al., "MobilisGroups: Location-based Group Formation in Mobile Social Networks," Second IEEE Workshop on Pervasive Collaboration and Social Networking, 2011, p. 502-507, IEEE.

Mell et al., "The NIST Definition of Cloud Computing," National Institute of Standards and Technology, Sep. 2011, p. 1-3, Special Publication 800-145.

\* cited by examiner

ORGANIZING LOCATION-BASED SOCIAL NETWORK COMMUNITIES

BACKGROUND

The present invention relates generally to the field of computing, and more particularly to social network services.

Social network services (SNS) provide users with a way to interact and share experiences with other people using a computing device over a network connection. Individuals often use SNS to socially connect with people they know as well as new people. Additionally, many individuals use SNS from a personal mobile device as they move about relating the experiences the individuals encounter throughout the day.

SUMMARY

According to one exemplary embodiment, a method for creating a social network service (SNS) community is provided. The method may include receiving a message from a user associated with an SNS. The method may also include determining a location of the received message based on a time and a position associated with the received message. The method may then include identifying at least one device from within a plurality of registered devices having the same location. The method may further include determining at least one device user based on the identified at least one device. The method may also include creating an SNS community based on the user and the determined at least one device user. The method may then include distributing messages between the user and the determined at least one device user.

According to another exemplary embodiment, a computer system for creating a social network service (SNS) community is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a message from a user associated with an SNS. The method may also include determining a location of the received message based on a time and a position associated with the received message. The method may then include identifying at least one device from within a plurality of registered devices having the same location. The method may further include determining at least one device user based on the identified at least one device. The method may also include creating an SNS community based on the user and the determined at least one device user. The method may then include distributing messages between the user and the determined at least one device user.

According to yet another exemplary embodiment, a computer program product for creating a social network service (SNS) community is provided. The computer program product may include one or more computer-readable storage devices and program instructions stored on at least one of the one or more tangible storage devices, the program instructions executable by a processor. The computer program product may include program instructions to receive a message from a user associated with an SNS. The computer program product may also include program instructions to determine a location of the received message based on a time and a position associated with the received message. The computer program product may then include program instructions to identify at least one device from within a plurality of registered devices having the same location. The computer program product may further include program instructions to determine at least one device user based on the identified at least one device. The computer program product may also include program instructions to create an SNS community based on the user and the determined at least one device user. The computer program product may then include program instructions to distribute messages between the user and the determined at least one device user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for organizing location-based social network communities. As such, the present embodiment has the capacity to improve the technical field of social network services (SNS) by connecting people into community groups based on proximity and time. More specifically, using location services (e.g., Global Positioning System), time, and SNS communication content, SNS users who may be experiencing an event in common with each other (e.g., a lecture, a sporting event, etc.) may be identified and grouped into a community where messages may be shared between the users within the community to connect socially regarding the event.

As described previously, social network services (SNS) provide users with a way to interact and share experiences with other people using a computing device over a network connection. Individuals often use SNS to socially connect with people they know as well as new people. Additionally, many individuals use SNS from a personal mobile device as they move about, relating the experiences the individuals encounter throughout the day. As people experience a common event and interact with SNS, the people experiencing the common event are often not in contact with each other.

Therefore, it may be advantageous to, among other things, provide a way to group SNS users into a community based on the users that are geographically positioned near one another at a point in time.

According to at least one embodiment, when an individual uses an SNS via an electronic device (e.g., the user's personal smartphone), the individual's location may be determined by using the Global Positioning System (GPS) coordinates of the electronic device the individual is using, by analyzing the wireless network connection, etc. Furthermore, the current time the individual uses the SNS may be tracked. When the individual uses the SNS to post a message, the time and location of the individual may be stored and compared with the location of other individuals associated with the SNS at the same time. The other individuals that may be within a distance threshold of the primary individual at the time the individual posts the message may be identified and grouped into a community and the message posted by the individual may be shared via SNS with the other identified individuals. Thus, individuals in the community may share messages via SNS relating to an experience they had in common by being near the same location at or near the same time (e.g., a concert).

By sharing messages between individuals within an ad hoc proximity-based community, individuals having similar interests (or having similar experiences) may be connected through an SNS to meet and share experiences via SNS. Thus, a community may be formed having the geographical location and the time as common elements to promote social connectivity.

Figure 1:
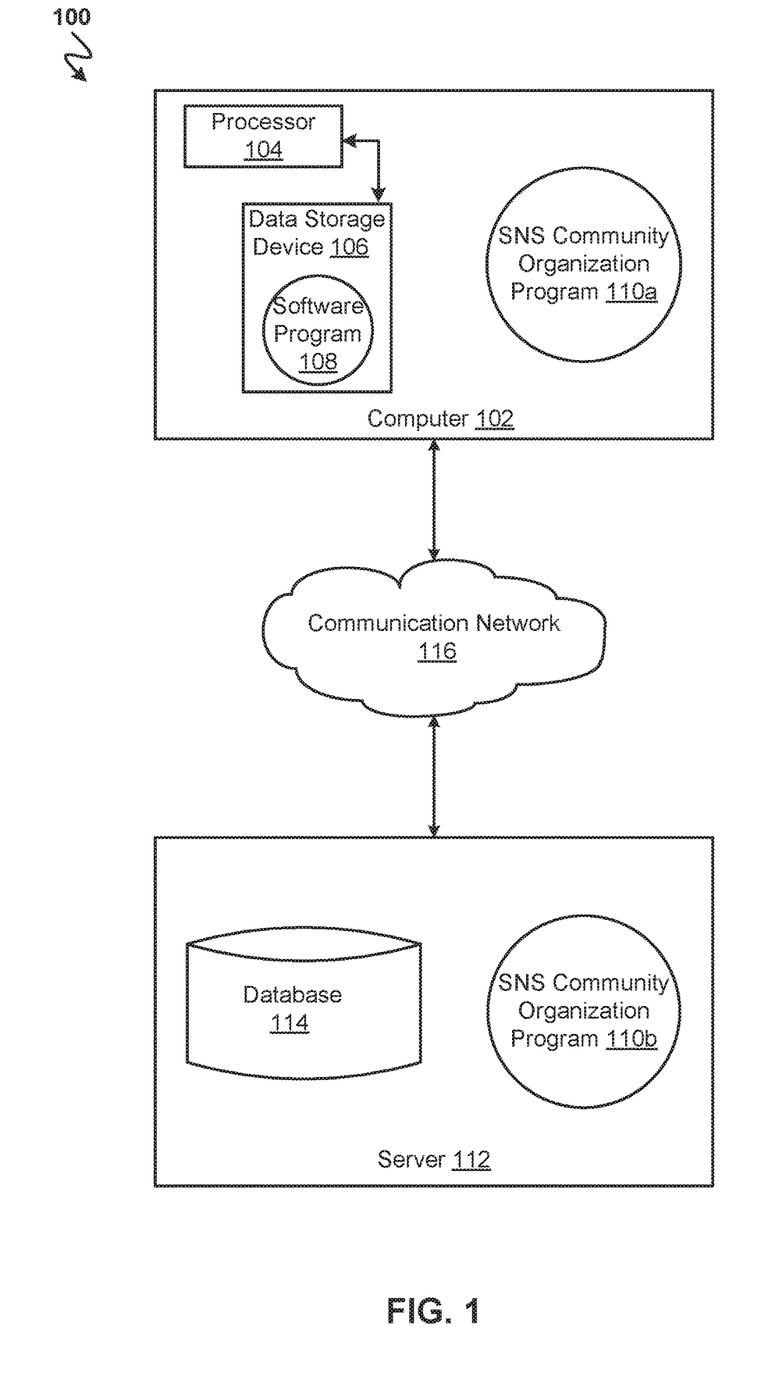
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a social network services (SNS) community organization program 110a. The networked computer environment 100 may also include a server 112 that is enabled to run a SNS community organization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the SNS community organization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the SNS community organization program 110a, 110b (respectively) to organize SNS users into community groupings based on physical and temporal proximity whereby SNS messages may be sent to the SNS users within the community. The SNS community organization method is explained in more detail below with respect to FIG. 2.

Figure 2:
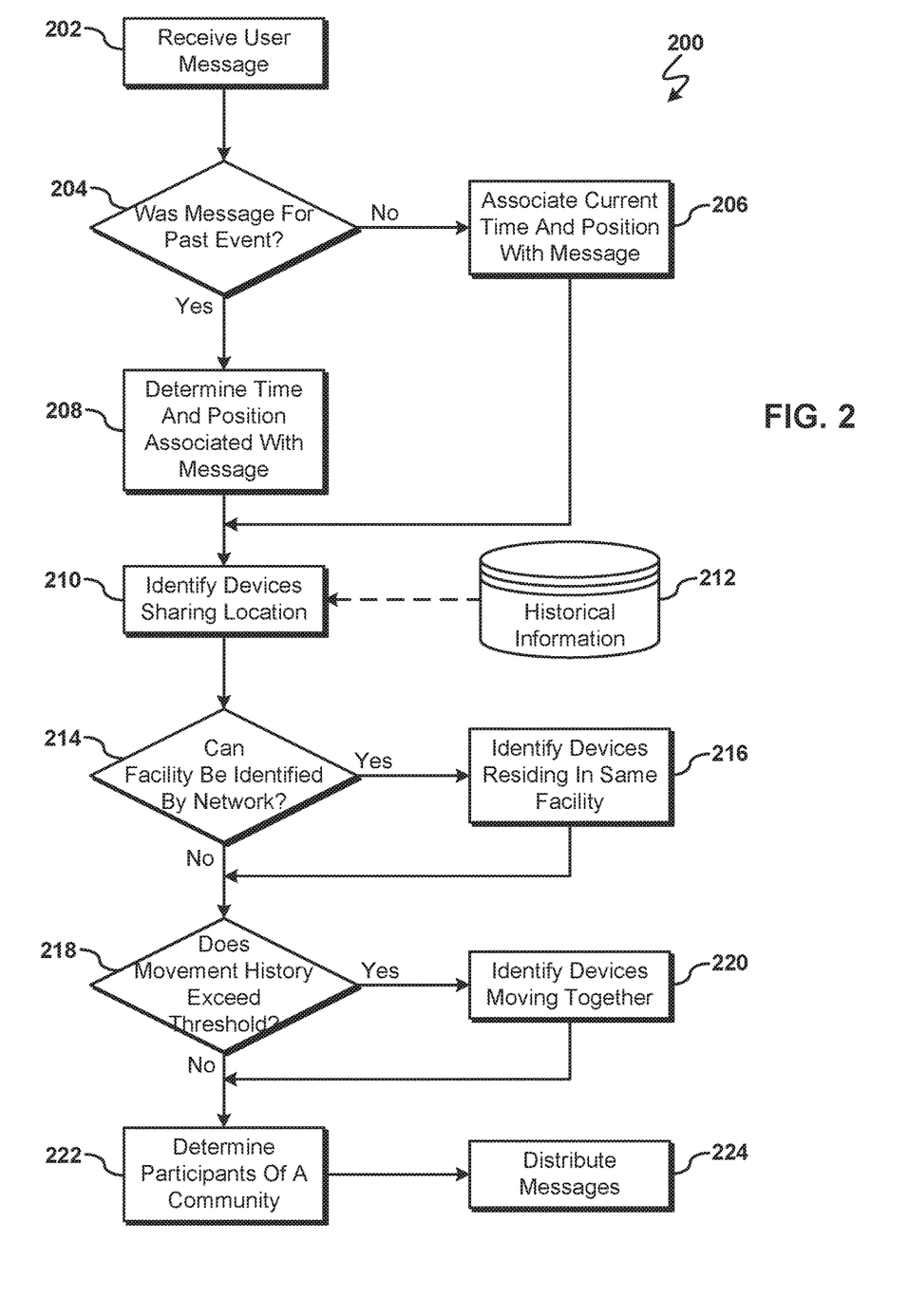
FIG. 2 is an operational flow chart illustrating a process for social network services (SNS) community organization according to at least one embodiment.

Referring now to FIG. 2, an operational flow chart illustrating the exemplary SNS community process 200 by the SNS community organization program 110a and 110b (FIG. 1) according to at least one embodiment is depicted.

At 202, a message from a user is received. According to at least one embodiment, an SNS user may compose an SNS message, such as a personal message, post, or comment. The message may contain text, pictures, video, symbols, or a combination of media. Additionally, the SNS message may be composed using a mobile electronic device, such as the user's personal smartphone. Once the user indicates that the message should be transmitted using the SNS, the user's message may be sent to, and received by, the SNS community process 200. Alternatively, the SNS may forward the message to the SNS community process 200 or the SNS community process 200 may intercept the message. For example, am SNS user may be attending a concert and compose a comment on the user's smartphone using an SNS application. Once the user has finished composing the message, the user may press a send button to send the composed comment via the SNS that may then be transmitted to, and received by, the SNS community process 200.

Next, at 204, it is determined if the received message relates to a past event. According to at least one embodiment, the received message may be analyzed to determine if the message relates to an event that occurred in the past. In the case of a message that includes text, the text may be parsed using known algorithms to determine that the message refers to an event (e.g., a concert). The scheduled time of the event may be determined, for example, by searching the internet and comparing the time of the event to the time the message was composed. Other textual cues may be identified, such as use of past tense.

In the case of images and video, a timestamp indicating the time the image or video was created may be compared with the current time to determine that the image or video was created in the past. For example, a threshold time value may be set (e.g., 30 minutes in the past) and any image or video created more than the threshold time value in the past (e.g., 3 hours) may be determined to be relating to a past event. Image analysis may also be used to locate landmarks, daylight levels, etc. to determine the location and time of the image or video.

If it is determined that the message does not relate to a past event at 204, then the current time and position of the user is determined and associated with the message at 206. According to at least one embodiment, the user's current position may be determined using known methods, such as by querying a Global Positioning System (GPS) receiver attached to a mobile device, triangulating the user's position from cell towers or wifi routers, etc. The current time may be determined by querying the current time on the electronic device running the SNS community process 200, by reading a timestamp associated with the user-composed message, etc. The current determined time and position may then be associated with the message as metadata. Additional metadata may also be associated with the user-composed message such network identifying information (e.g., internet protocol (IP) address of the router the user's smartphone is connected to, etc.).

However, if it is determined that the message does relate to a past event at 204, then the time and position associated with the message content is determined at 208. As described previously at 204, the message may have been analyzed to determine if the message relates to a past event by identifying indicators of a past event. For example, if the user composes a message containing a statement indicating the user's opinion of a speech given at a software development conference, the message may be parsed to identify the name of the software development conference. Using the identified software development conference name, an internet search may be performed to determine information regarding the time and geographic position of the software development conference indicated in the user's message. The time and position determined previously to be associated with the conference (i.e., at step 204) may then be associated with the user-composed message as metadata. Additional metadata may also be associated with the user-composed message such network identifying information.

Then, at 210, other devices sharing the location (i.e., time and position) of the message are identified. According to at least one embodiment, based on the determined location (i.e., time and position) metadata associated with the user's message at 206 or 208, the location of other electronic devices (e.g., smartphones) registered with the SNS community process 200 (e.g., other users of the SNS) may be searched for devices that were at the location at the time the user composed the message. A data repository containing historical information 212 (e.g., database 114 (FIG. 1)) may be queried to retrieve time, position, and other relevant data related to electronic devices registered by SNS users.

A pool of potential devices sharing the location may be derived from the historical information 212 of the registered devices by filtering out devices from the pool that are not within time and/or position thresholds. For example, a position threshold may be defined as a distance of up to 100 yards from the position data associated with the user's message. Thus, registered devices that are more than 100 yards from the position associated with the user's message may be filtered from the pool of potential devices. Furthermore, a time threshold may be set, for example, to five minutes. Any devices within the pool of potential devices may be filtered out that were not within the position threshold between five minutes before the user's message was composed to five minutes after the user's message was composed.

At 214, it is determined if the user composed the message within a facility (e.g., building) that can be identified by network information. According to at least one embodiment, network identifying metadata previously associated with the user's message (i.e., at step 206 or 208) may be used to determine if a facility may be identified. For example, the network identifying information may include router identification (e.g., IP address). The router identification may be used as the basis of a search to find a facility that operates the router (e.g., a university).

If it was determined at 214 that a facility has been identified from the network information, the devices residing in the same facility are identified at 216. According to at least one embodiment, the data retrieved from the historical information 212 database previously at 210 may include network identifying information, such as identifying the routers the electronic devices were connected to at the time the user's message was composed. The facility (e.g., a convention center) network the user was connected to when composing the user message may be compared with network information associated with devices within the pool of potential devices. Devices within the pool that were not connected to the network associated with the facility the user was connected to may be filtered out of the pool of potential devices.

For example, if the user composed the message while connected to a router at University A, the router identification associated with the user's message as metadata at step 206 or 208 may be used to determine that the user composed the message while at University A as explained previously at step 214. Thereafter, all routers operated by University A may be queried for router identification. Once all routers operated by University A have been identified, the pool of potential devices may be searched for devices that were connected to one of University A's routers. Devices that were not connected to one of University A's routers may be filtered out of the pool of potential devices.

If it was determined that a facility cannot be identified by the network at 214, or if devices that reside in the same facility were identified at 216, then it is determined if the movement history of the devices within pool of potential devices exceeds a movement history threshold at 218. According to at least one embodiment, position data may be analyzed over time intervals to determine movement of the user that composed the message relative to the other devices within the pool of potential devices. The user's position data and a period of time before and after the message was composed may be stored to use for comparing against other devices. For example, the user's position at 30 second intervals for the five minutes before the user's message was sent and for the five minutes after the message was sent may be stored. Thereafter, the user's position data at each interval may be compared to the position data associated with the devices within the pool of potential devices. If the number of devices within the pool of potential devices that move in a similar direction (e.g., West), at a similar speed (e.g., 40 mph), and stay within a threshold distance from the composing user (e.g., 100 yards) exceeds a threshold moving group value (e.g., ten devices), it may be determined that the movement threshold has been exceeded. For example, if an SNS user sends a message while riding a train, the devices registered to other SNS users on the train will travel in a similar direction to the user that sent the message, at a similar speed, and stay within a threshold distance from the user over the course of a predefined time interval (e.g., the five minutes before and five minutes after the user sent the composed message). If there are 15 SNS users with SNS registered devices within the pool of potential devices riding the train with the SNS user that sent the message and a threshold moving group value of 10, then it will be determined that the movement history of the devices within pool of potential devices exceeds the movement history threshold since the 15 devices moving with the composing user exceeds the threshold of 10.

If the movement history of devices were determined to exceed the movement history threshold at 218, the devices exceeding movement history threshold will be identified as moving together at 220. According to at least one embodiment, the devices within the pool of potential devices that were determined to have moved in a similar direction, at a similar speed and were within the threshold distance from the user previously at 218 may be used as the pool of potential devices since it was determined at 218 that the user was moving with a group. Thus, devices within the pool of potential devices that were not moving with the user may be filtered out of the pool of potential devices.

However, if it was determined that the movement history does not exceed the threshold at 218, or if the devices moving together were identified at 220, the participants of an SNS community are determined at 222. According to at least one embodiment, the SNS users associated with the devices remaining in the pool of potential devices, along with the user that sent the message, may be determined to be an SNS community. The SNS users associated with the devices within the pool of potential devices may be identified from information received at the time the device was registered. For example, when an SNS user registers a device, the user may be required to supply an SNS username and/or the user's full name. In the case when multiple SNS users may use the same registered device, the SNS users associated with the device may be prompted to indicate which SNS user(s) will join the SNS community.

Next, at 224, messages are distributed between SNS users that are a part of the SNS community determined previously at 222. According to at least one embodiment, the message composed and sent by the user at 202 may be distributed to the members of the SNS community. Thereafter, messages sent from the members of the SNS community may be distributed to the other members of the SNS community. According to at least one other embodiment, the messages sent by users within the community may be limited to messages relating to the topic or event the community was formed around (e.g., a lecture). The topic may be identified based on the message that started the community using text analysis or image/video analysis depending on the message content. Thereafter, messages from other member of the community may be similarly analyzed to determine if the message content is related. For messages that are related, the messages may be distributed between SNS users that are a part of the SNS community. Messages within the SNS community may be distributed until the SNS community expires.

According to at least one embodiment, the SNS community may expire (or be terminated) based on an expiration condition, such as by lapse of time. For example, a community may expire when a predetermined period of time (e.g., 12 hours) has elapsed after the last message. According to at least one other embodiment, the SNS community may expire after a predefined period of time (e.g., 4 hours) when the rate of posting (i.e., posting frequency) drops below a predefined threshold (e.g., one post per hour). According to yet another embodiment, the time a until an SNS community expires may be adjusted based on the number of contributing users. For example, if only a particular contributing user or users continue to contribute (i.e., send messages), then the time until the community expires may not change. However, if many users are contributing to the community (e.g., by sending messages or posts), the ratio of remaining time may increase.

According to one other embodiment, the amount of time an SNS community exists may depend on the location. For example, the ratio of time that the community is extended may be based on if the location associated with the community is a location where a community is likely to occur again (e.g., a convention center). Thus, communities associated with locations that may be likely to have another community may take longer to expire since a new event may occur that results in community members sending messages again and extending the usefulness of the community.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
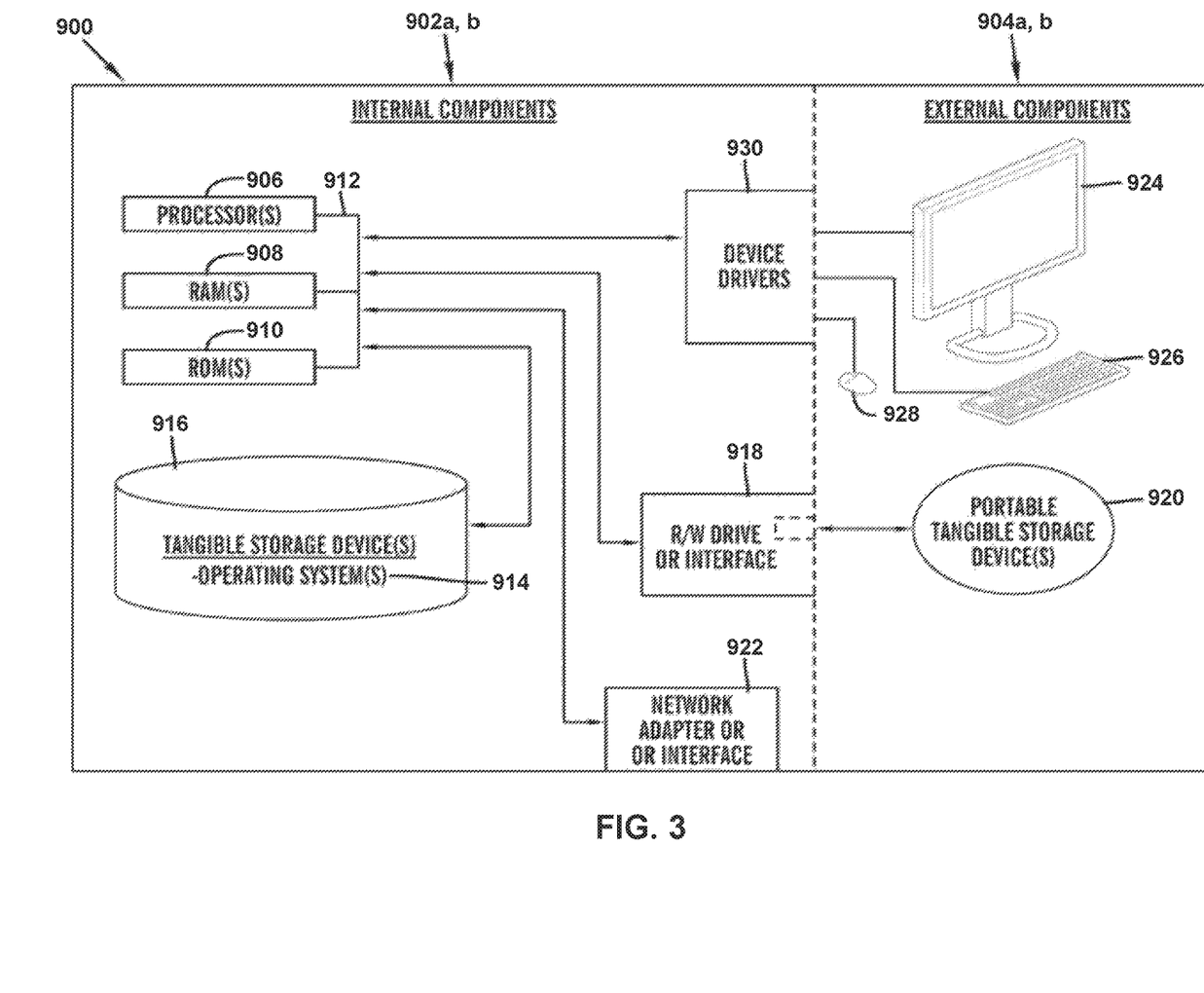
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the SNS community organization program 110a (FIG. 1) in client computer 102 (FIG. 1) and the SNS community organization program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the SNS community organization program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the SNS community organization program 110a (FIG. 1) in client computer 102 (FIG. 1) and the SNS community organization program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the SNS community organization program 110a (FIG. 1) in client computer 102 (FIG. 1) and the SNS community organization program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
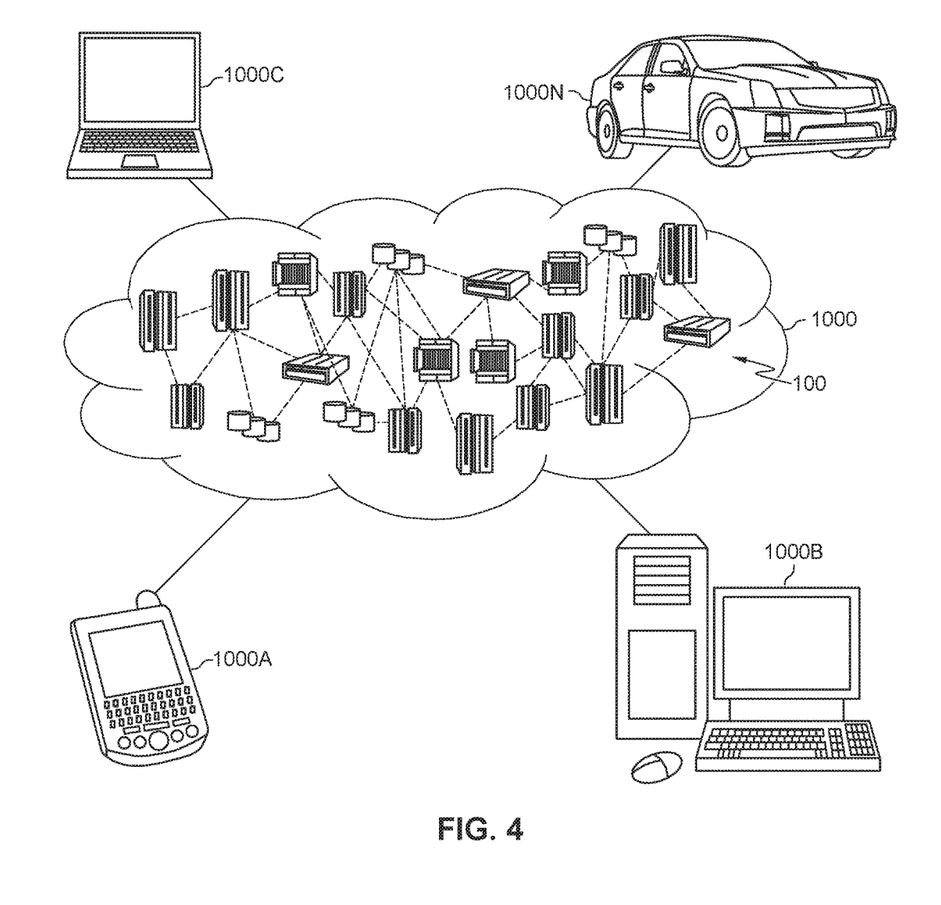
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
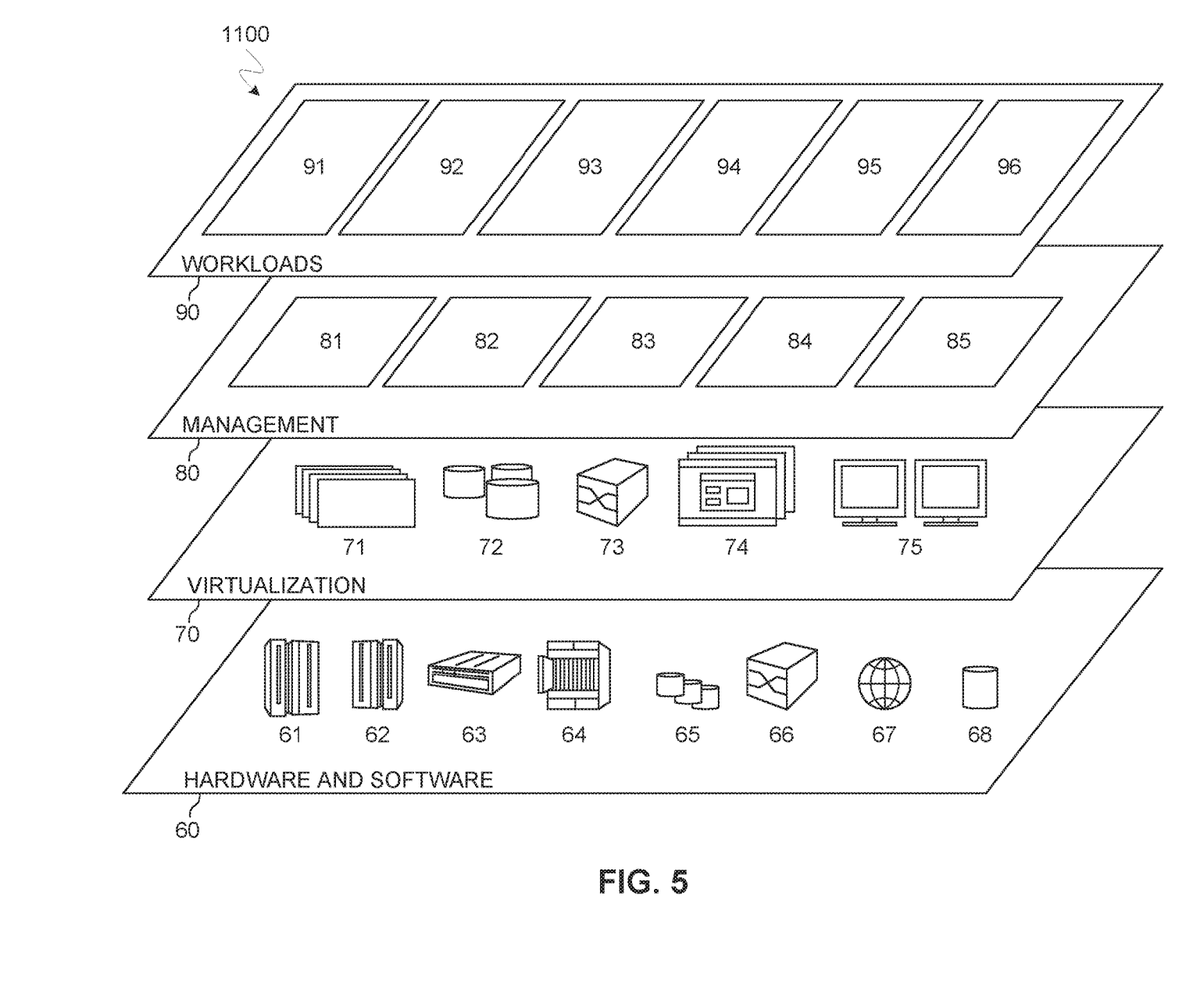
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SNS community organization 96. An SNS community organization program 110*a*, 110*b* (FIG. 1) provides a way to organize SNS users into community groupings based on physical proximity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating a social network service (SNS) community, the method comprising:

receiving an SNS message over a network connection from a user device associated with a user, wherein the user is associated with an SNS;

determining a location of the received SNS message based on a time and a position associated with the received SNS message, wherein determining the location of the received SNS message comprises:

determining that the received SNS message relates to a past event, wherein determining that the received SNS message relates to the past event comprises using image analysis on an image within the received SNS message to identify an event related to the received SNS message, and wherein the identified event is determined to have occurred in the past;

in response to determining that the received SNS message relates to the past event, determining an event position and an event time based on the image analysis of the image; and assigning the determined event time to the time of the received SNS message and assigning the determined event position to the position of the received SNS message;

identifying at least one device from within a plurality of registered devices having the same location as the determined location of the received SNS message, wherein identifying the at least one device from within the plurality of registered devices having the same location comprises:

determining that the received SNS message was sent using the network connection associated with a facility, wherein determining that the received SNS message was sent using the network connection comprises retrieving a network identifying information from a historical database and matching facility network identifying information with user network identifying information; and determining that the at least one device was connected to the network at the same time as the time associated with the received SNS message;

determining at least one device user based on the identified at least one device;
creating an SNS community based on the user and the determined at least one device user; and
distributing a plurality of SNS messages between devices associated with the user and the determined at least one device user based on the created SNS community.

2. The method of claim 1, wherein identifying the at least one device from within the plurality of registered devices having the same location comprises determining that the at least one device has a device position within a position threshold of the position associated with the received SNS message and determining that the at least one device has a device time within a time threshold of the time associated with the received SNS message.

3. The method of claim 1, wherein identifying the at least one device from within the plurality of registered devices having the same location comprises determining that a device position associated with the at least one device moved corresponding with a direction and a speed associated with the user over a time period.

4. The method of claim 1, further comprising:
terminating the created SNS community based on an expiration condition.

5. A computer system for creating a social network service (SNS) community, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving an SNS message over a network connection from a user device associated with a user, wherein the user is associated with an SNS;
determining a location of the received SNS message based on a time and a position associated with the received SNS message, wherein determining the location of the received SNS message comprises:
determining that the received SNS message relates to a past event, wherein determining that the received SNS message relates to the past event comprises using image analysis on an image within the received SNS message to identify an event related to the received SNS message, and wherein the identified event is determined to have occurred in the past;
in response to determining that the received SNS message relates to the past event, determining an event position and an event time based on the image analysis of the image; and
assigning the determined event time to the time of the received SNS message and assigning the determined event position to the position of the received SNS message;
identifying at least one device from within a plurality of registered devices having the same location as the determined location of the received SNS message, wherein identifying the at least one device from within the plurality of registered devices having the same location comprises:
determining that the received SNS message was sent using the network connection associated with a facility, wherein determining that the received SNS message was sent using the network connection comprises retrieving a network identifying information from a historical database and matching facility network identifying information with user network identifying information; and
determining that the at least one device was connected to the network at the same time as the time associated with the received SNS message;
determining at least one device user based on the identified at least one device;
creating an SNS community based on the user and the determined at least one device user; and
distributing a plurality of SNS messages between devices associated with the user and the determined at least one device user based on the created SNS community.

6. The computer system of claim 5, wherein identifying the at least one device from within the plurality of registered devices having the same location comprises determining that the at least one device has a device position within a position threshold of the position associated with the received SNS message and determining that the at least one device has a device time within a time threshold of the time associated with the received SNS message.

7. The computer system of claim 5, wherein identifying the at least one device from within the plurality of registered devices having the same location comprises determining that a device position associated with the at least one device moved corresponding with a direction and a speed associated with the user over a time period.

8. The computer system of claim 5, further comprising:
terminating the created SNS community based on an expiration condition.

9. A computer program product for creating a social network service (SNS) community, comprising:
one or more computer-readable storage media and program instructions stored on at least one of the one or more computer-readable storage media, the program instructions executable by a processor, the program instructions comprising:
program instructions to receive an SNS message over a network connection from a user device associated with a user, wherein the user is associated with an SNS;
program instructions to determine a location of the received SNS message based on a time and a position associated with the received SNS message, wherein determining the location of the received SNS message comprises:
program instructions to determine that the received SNS message relates to a past event, wherein determining that the received SNS message relates to the past event comprises using image analysis on an image within the received SNS message to identify an event related to the received SNS message, and wherein the identified event is determined to have occurred in the past;
in response to determining that the received SNS message relates to the past event, program instructions to determine an event position and an event time based on the image analysis of the image;
program instructions to assign the determined event time to the time of the received SNS message and assign the determined event position to the position of the received SNS message;
program instructions to identify at least one device from within a plurality of registered devices having the same location as the determined location of the received SNS message, wherein identifying the at least one device from within the plurality of registered devices having the same location comprises:

program instructions to determine that the received SNS message was sent using the network connection associated with a facility, wherein determining that the received SNS message was sent using the network connection comprises retrieving a network identifying information from a historical database and matching facility network identifying information with user network identifying information; and program instructions to determine that the at least one device was connected to the network at the same time as the time associated with the received SNS message;

program instructions to determine at least one device user based on the identified at least one device;

program instructions to create an SNS community based on the user and the determined at least one device user; and program instructions to distribute a plurality of SNS messages between devices associated with the user and the determined at least one device user based on the created SNS community.

10. The computer program product of claim 9, wherein identifying the at least one device from within the plurality of registered devices having the same location comprises determining that the at least one device has a device position within a position threshold of the position associated with the received SNS message and determining that the at least one device has a device time within a time threshold of the time associated with the received SNS message.

11. The computer program product of claim 9, wherein identifying the at least one device from within the plurality of registered devices having the same location comprises determining that a device position associated with the at least one device moved corresponding with a direction and a speed associated with the user over a time period.

12. The computer program product of claim 9, further comprising:

program instructions to terminate the created SNS community based on an expiration condition.

* * * * *